United States Patent
Andersen et al.

(10) Patent No.: US 9,574,572 B2
(45) Date of Patent: Feb. 21, 2017

(54) COMPRESSOR CONTROL METHOD AND SYSTEM

(75) Inventors: Soeren Boegh Andersen, Helsingoer (DK); Frans Ploeger, Hilleroed (DK); Richard H. Vinton, Springfield, MO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 1216 days.

(21) Appl. No.: 13/575,075

(22) PCT Filed: Jan. 25, 2011

(86) PCT No.: PCT/EP2011/050969
§ 371 (c)(1),
(2), (4) Date: Oct. 9, 2012

(87) PCT Pub. No.: WO2011/092157
PCT Pub. Date: Aug. 4, 2011

(65) Prior Publication Data
US 2013/0045076 A1    Feb. 21, 2013

(30) Foreign Application Priority Data
Jan. 27, 2010  (EP) .................................. 10000809

(51) Int. Cl.
*F04D 27/00* (2006.01)
*F04D 29/40* (2006.01)
*F04D 27/02* (2006.01)

(52) U.S. Cl.
CPC ....... *F04D 27/0261* (2013.01); *F04D 27/0246* (2013.01); *F04D 27/0284* (2013.01)

(58) Field of Classification Search
CPC .... F04D 15/0038; F04D 27/00; F04D 27/002; F04D 27/004; F04D 27/007; F04D 27/02; F04D 27/0246; F04D 27/0261; F04D 27/0284; F05D 2270/02; F05D 2270/03; F05D 2270/101; F05D 2270/102; F05D 2270/301; F05D 2270/302; F05D 2270/306
See application file for complete search history.

(56) References Cited

U.S. PATENT DOCUMENTS 5,355,691 A * 10/1994 Sullivan .............. F04D 27/0261
                                                        415/17
5,618,160 A *  4/1997 Harada ............... F04D 27/0246
                                                        415/15

(Continued)

FOREIGN PATENT DOCUMENTS

| CN | 1115011 A | 1/1996 |
|---|---|---|
| CN | 1118876 A | 3/1996 |

(Continued)

*Primary Examiner* — Craig Kim
*Assistant Examiner* — Julian Getachew

(57) ABSTRACT

A compressor control method includes providing variable aerodynamic sizing of fluid flow through a compressor at multiple operating points of the compressor. A head is determined for an operating point, based on a process input at that operating point. Further, for that operating point, a control pressure number is determined as a function aerodynamic flow sizing at that operating point. The control pressure number is determined a function of the head divided by the square of a tip speed of the impeller of the compressor. An operating speed setpoint is determined based on the determined head and control pressure number.

11 Claims, 3 Drawing Sheets

(56) References Cited

U.S. PATENT DOCUMENTS

| | | | | |
|---|---|---|---|---|
| 5,947,680 A | * | 9/1999 | Harada | ............... F04D 27/0284 415/17 |
| 2009/0055071 A1 | * | 2/2009 | Way | .......................... F02C 9/28 701/100 |

FOREIGN PATENT DOCUMENTS

| | | |
|---|---|---|
| EP | 0186332 A1 | 7/1986 |
| EP | 0366219 A2 | 5/1990 |
| EP | 0366219 B1 | 11/1993 |
| EP | 0761981 A2 | 3/1997 |
| WO | WO 2006017365 A2 | 2/2006 |

* cited by examiner

COMPRESSOR CONTROL METHOD AND SYSTEM

CROSS REFERENCE TO RELATED APPLICATIONS

This application is the US National Stage of International Application No. PCT/EP2011/050969, filed Jan. 25, 2011 and claims the benefit thereof. The International Application claims the benefits of European application No. 10000809.3 EP filed Jan. 27, 2010. All of the applications are incorporated by reference herein in their entirety.

FIELD OF INVENTION

The present invention relates to compressors and in particular to controlling the operation of variable speed compressors having means for sizing aerodynamic fluid flow, such as, for example, variable diffusers, inlet guide vanes, among others.

BACKGROUND OF INVENTION

A compressor generally includes a diffuser for reducing the speed of a fluid disposed downstream of the outlet side of an impeller to convert the dynamic energy into a static pressure. Some compressors include diffusers with variable geometry, for example, in the form of adjustable diffuser vane angles. A variable diffuser is used for aerodynamically sizing the flow through the compressor with the aim of minimizing flow losses. However, currently, speed control in compressors is based on a single point diffuser setting. Disadvantageously, this leads to an increase in power consumption and/or reduction in efficiency of the compressor when the diffuser setting is changed.

The documents EP 0 186332 A1, WO 2006/017365 A2 and EP 0 761 981 A2 deal with a method of the incipiently mentioned type.

SUMMARY OF INVENTION

The object of the present invention is to provide a method and system for controlling compressor speed at multiple operating points having variable settings for aerodynamic flow sizing.

The above object is achieved by the features of the independent claims.

The underlying idea of the present invention is to achieve compressor speed control at multiple operating points, wherein aerodynamic flow sizing is used as a basis for speed control. Accordingly, for an operating point, the required head (H) is determined and a dimensional quantity referred to as pressure number ($\psi$) is determined for maximum flow taking into account the aerodynamic flow sizing at that operating point. Based on a relationship between head and pressure number, the operating speed setpoint is obtained as a function of the square root of the ratio of the determined head determined and the pressure number ($\psi$). The proposed technique advantageously minimizes energy consumption by operating the compressor at the highest efficiency.

In an exemplary embodiment, said aerodynamic flow sizing is defined by a variable diffuser position. This embodiment would thus allow an operator to control compressor by controlling the variable diffuser position.

In one embodiment, said determining of said control pressure number is based on a relationship between pressure number and aerodynamic flow sizing, said relationship being defined by a control curve configured for operating said compressor with a minimum margin to surge at said operating point. Advantageously, the control curve would provide for maximum flow and efficiency at said operating point In one embodiment, said process input includes a measured compressor inlet temperature. This is a low cost solution, wherein remaining process inputs for determining the head may include fixed values, obtained, for example, from a performance data sheet of the compressor.

In a further embodiment, said process input further includes a compressor discharge pressure, wherein said head is determined based on a pressure surge margin added to said compressor discharge pressure. The surge margin is thus taken into account while computing the head, so that the control pressure number may be configured to be as close as possible to that at the point of surge.

In one embodiment, said control curve is obtained by:
 determining maximum and minimum aerodynamic flow sizing limits for which flow is achievable,
 determining a maximum pressure number that would produce flow for said maximum aerodynamic flow sizing limit, and a maximum speed possible for said maximum pressure number, based on performance data of said compressor,
 obtaining a test data graph of pressure number at surge versus aerodynamic flow sizing, for various compressor speeds,
 plotting a first point on said graph defined by said maximum aerodynamic flow sizing limit and said maximum pressure number obtained from performance data,
 plotting a second point on said graph defined by a minimum pressure number at surge at said maximum speed and a corresponding aerodynamic flow sizing value, said corresponding aerodynamic flow sizing value being intermediate to said maximum and minimum aerodynamic flow sizing limits,
 plotting a third point on said graph defined by said minimum aerodynamic flow sizing limit and the corresponding pressure number at surge for said minimum aerodynamic flow sizing limit, at said maximum speed, and
 obtaining a first line defined by the first point and the second point, and a second line defined the second point and the third point, wherein said control curve is formed by said first and second lines.

The above embodiment presents a linear relationship between pressure number and aerodynamic flow sizing, thus providing simplicity in computing the pressure number. The control curve thus obtained provides for operating the compressor at maximum efficiency, and thus optimizes power consumption.

In one embodiment, to further customize the method to match the job specific performance data sheet (PDS) and test data, the proposed method further comprises obtaining a test data graph of isentropic head versus flow for various aerodynamic flow sizing values, and therefrom determining maximum and minimum aerodynamic flow sizing limits for which flow is achievable.

In a further embodiment, the method further comprises controlling shaft rotational speed of the compressor using said determined operating speed setpoint, based on a closed loop feedback control mechanism. In a further embodiment to the above, the proposed method further comprises
 determining a positive and a negative dead band window around said operating speed setpoint,
 obtaining a measured shaft rotational speed, and providing the operating speed setpoint to a variable frequency drive if the measured speed lies outside the positive and negative dead band windows.

Determining the dead band windows advantageously removes instrumentation and calculation dither from the speed signal. This allows the variable frequency drive to react to a true change in conditions rather than noise.

BRIEF DESCRIPTION OF THE DRAWINGS

The present invention is further described hereinafter with reference to illustrated embodiments shown in the accompanying drawings, in which.

DETAILED DESCRIPTION OF INVENTION

Figure 1:
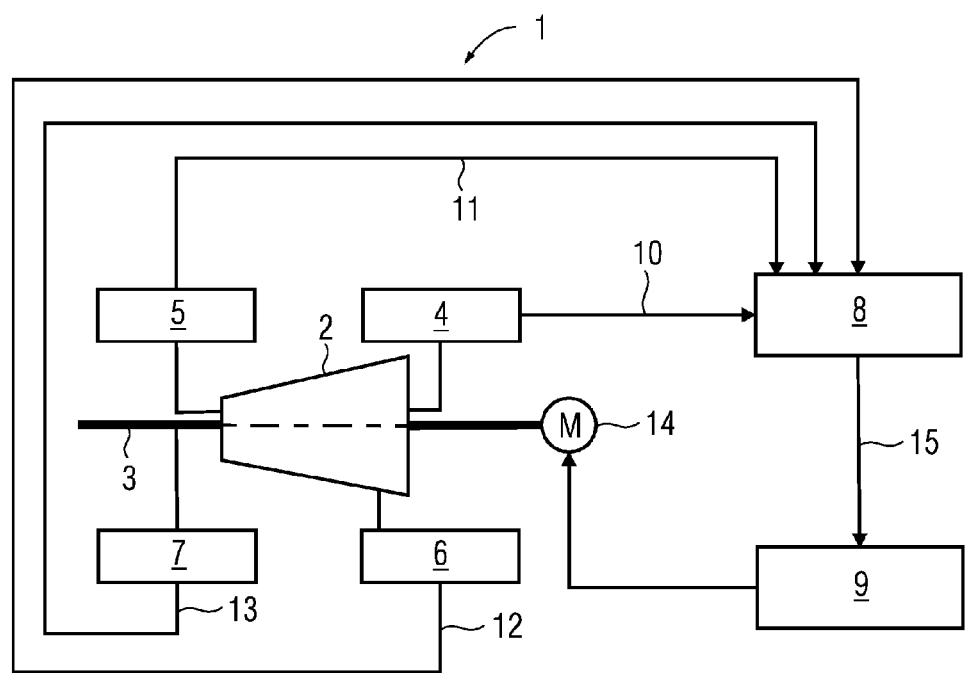
FIG. 1 is a compressor system in accordance with one embodiment of the present invention.

Referring to FIG. 1 is illustrated a compressor system 1 according to an exemplary embodiment of the present invention. The system 1 includes a compressor 2 drivable by an electrical motor 14 via a shaft 3. A computerized control means 8 controls the operation of the compressor 2 based on a process input at each operating point of the compressors. The process input includes process values, for example, the temperature of the compressor fluid at section (inlet temperature), pressure of the compressor fluid at discharge (discharge pressure), temperature of the compressor fluid at discharge (discharge temperature), barometric pressure, relative humidity, among others. Accordingly, a sensor module may be provided for measuring one or more of these process values. In this example, the sensor module includes a temperature sensor 4 and a pressure sensor 5 appropriately disposed for measuring the compressor inlet temperature and discharge pressure, respectively. The control means 8 receives the sensed process values from the sensors 4 and 5 via data lines 10 and 11. The remaining process values may be obtained as fixed values, for example from a performance data sheet (PDS) of the compressor. Alternately, additional sensors may be provided for measuring one or more of these remaining process values. On the other hand, in a low cost embodiment, only a compressor inlet temperature sensor may be provided, while the rest of the process values may be obtained as fixed values from the compressor PDS.

The computerized control means 8 may include, for example, a programmable logic controller (PLC), a microcontroller, a desktop computer, or even a general purpose microprocessor.

To optimize flow losses, fluid flow through the compressor 2 may be aerodynamically sized at various operating points of the compressor 2. This can be achieved by controlling volumetric flow through the compressor 2, for example, via a variable geometry diffuser, or variable geometry inlet guide vanes, or any other means which allow the volumetric flow through the compressor 2 to be adjusted. In the present example, volumetric flow control is achieved via variable geometry diffuser, which may be controlled, for example, in response to an operator input. The position of the variable diffuser at any operating point thus defines the aerodynamic flow sizing at the operating point.

A sensor 6 measures the position of the variable diffuser and communicates the sensed data to the control means 8 via data line 12. For any operating point of the compressor 2, based on the aerodynamic flow sizing value (i.e., variable diffuser position in this example) obtained from the sensor 6 and the measured process values obtained from the sensors 4 and 5, the control means 8 determines an operating speed setpoint of the compressor shaft 3, using a control algorithm in accordance with the present invention that is described in detail hereinafter. A rotational speed sensor 7 measures the actual shaft speed and communicates the same to the control means 8 via feedback data line 13. Based on the determined speed setpoint and the measured feedback speed, the control means 8 communicates a control signal 15 to a variable frequency drive 9 for controlling the rotational speed of the motor 14, and thereby, the rotational shaft speed of the compressor 2 based on a closed loop feedback control mechanism.

Embodiments of the present invention described hereinafter provide a control algorithm for determining an operational speed setpoint of a compressor based on aerodynamic flow sizing at the compressor and for controlling the compressor shaft speed based on the determined speed setpoint.

Certain terms used in the present discussion are defined hereinbelow.

The term "head" or "compressor head" as used in the context of the illustrated embodiments refers to the isentropic head (H) of a compressor, which is defined as a difference between the enthalpy of the compressor fluid at inlet (or suction) pressure and temperature and enthalpy of the compressor fluid at discharge pressure and suction entropy. Mathematically, the isentropic head (H) may be represented by the relationship (1) below:

$$H = f\left(Cp, Ti, \frac{P2}{P1}, k\right) \quad (1)$$

wherein,

Cp specific heat of the compressor fluid at constant pressure

Ti is the compressor inlet temperature,

P1 is the inlet or suction pressure

P2 is the discharge pressure, and k is the ratio of specific heats of the compressor fluid.

The term "pressure number" ($\psi$) as used in the context of the illustrated embodiments a dimensionless quantity, which is a function of the compressor head (H) and the square of the impeller tip speed (U), which may be expressed by the relationship (2) below:

$$\psi = f\left(H, \frac{1}{U^2}\right) \quad (2)$$

wherein,

H is the compressor head, and

U is the impeller tip speed.

The impeller tip speed (U), in turn, is a function of the compressor speed N and the impeller tip diameter (D2) as expressed by relationship (3) below:

$$U = f(N, D2) \quad (3)$$

In the context of the present discussion, the compressor speed (N) refers to the rotational shaft speed of the compressor.

In accordance with an aspect of the present invention, for each operating point of the compressor, the compressor head (H) and pressure number ($\psi$) are determined, taking into account the aerodynamic flow sizing at that operating point. In the illustrated example, the aerodynamic flow sizing is provided by a variable geometry diffuser, referred to as a variable diffuser. However, it would be appreciated that aerodynamic flow sizing may be provided by other means, such as variable geometry inlet guide vanes. The pressure number ($\psi$) is determined as a control pressure number for maximum flow at that operating point, as a function of the variable diffuser position at that operational point. Finally, the operating setpoint for the compressor speed (N) is computed from the determined head (H) and control pressure number ($\psi$), based on the relationships (2) and (3) above.

As noted from equation (2) above, the pressure number ($\psi$) is a function of isentropic head (H) divided by the square of the tip speed (U). In accordance with an exemplary embodiment of the present invention, the pressure number ($\psi_S$) at surge is determined as a function of VD position. The control pressure number ($\psi$) required for maximum flow may not be equal to the surge pressure number ($\psi_S$) but a lower value determined by the operator's maximum performance data sheet flow requirement. Since the tip speed (U) is a function of shaft speed and impeller tip diameter ($D_2$), the operating shaft speed setpoint can be obtained by the square root of the ratio of isentropic head (H) to the control pressure number ($\psi$). The proposed algorithm advantageously minimizes energy consumption by operating the compressor at the highest efficiency.

Figure 2:
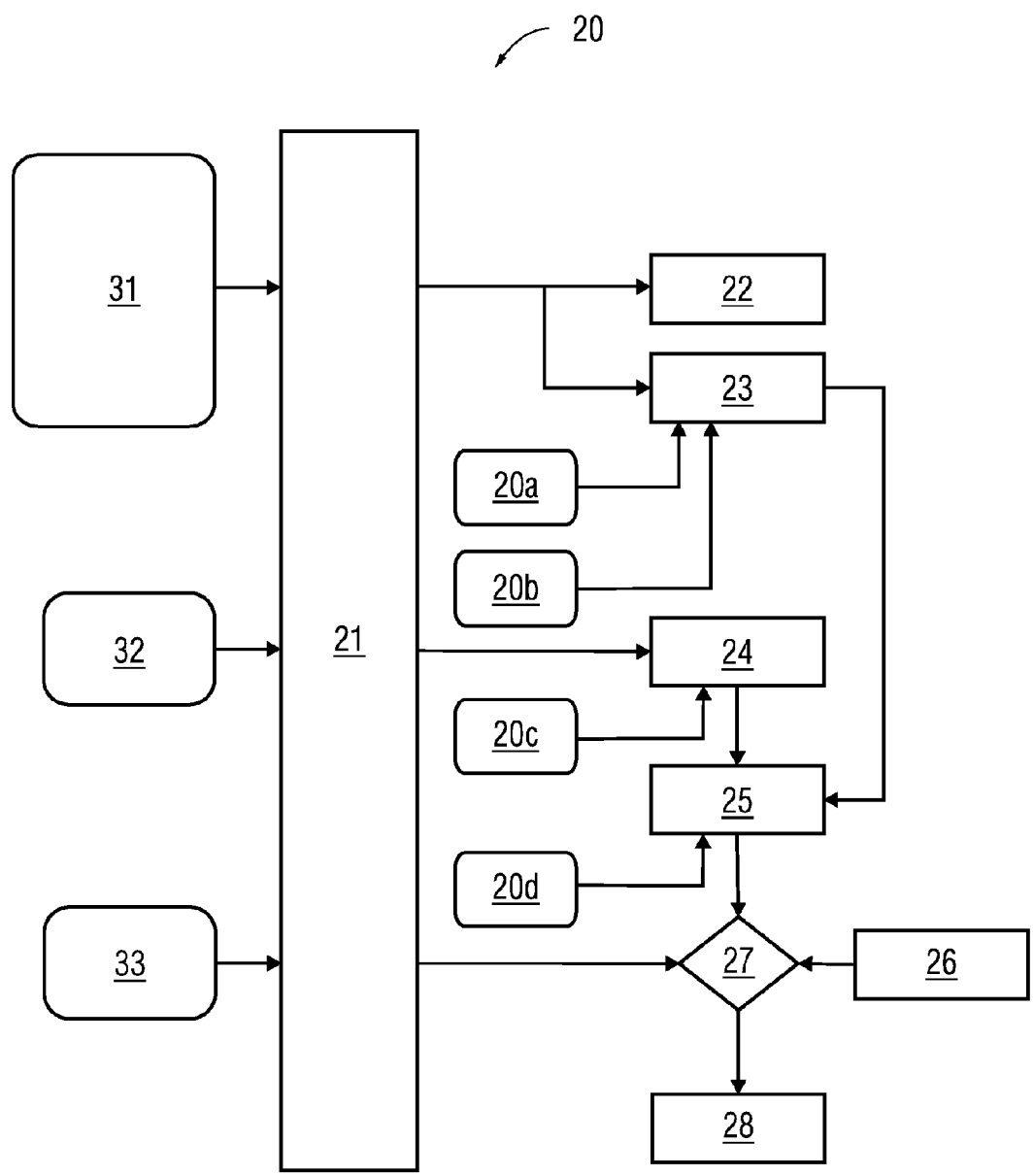
FIG. 2 is a flowchart illustrating an exemplary compressor control method in accordance with one embodiment of the present invention.

FIG. 2 is a flowchart illustrating an exemplary control algorithm 20, in accordance with one embodiment of the present invention. In the present example, the control algorithm is executed by a PLC. However, in alternate embodiments, the control algorithm may be executed by any other computerized control means, such as a microcontroller, a desktop computer, or even a general purpose microprocessor. At any operating point, the inputs to the algorithm 20 include the process input 31, an input 32 indicating the aerodynamic flow sizing (i.e., variable diffuser position in this example) at that operating point and an input 33 indicating the sensed compressor speed feedback. At block 21, an error check is performed on these inputs, wherein if any of these inputs lies outside specified maximum and/or minimum limits, they are replaced by default values.

As mentioned above, the process input 31 include process values, including, for example, the compressor inlet temperature, the discharge pressure, discharge temperature, primary filter pressure loss, secondary filter pressure loss, barometric pressure, and relative humidity. These inputs may be obtained dynamically, for example, from respective sensors provided in the compressor package. In an alternate (low cost) embodiment, the above dynamic inputs can be limited to just inlet temperature. The other process values can be entered as fixed numbers from the performance data sheet (PDS) of the compressor.

At block 22, based on the process values obtained from the process input 31, various constants are calculated which form the basis for determining the compressor head. These constants include, for example, the saturation pressure of water, partial pressure of the water in the flow stream, specific gas constant of the compressor fluid and ratio of specific heats of the compressor fluid. At block 23, based on the relationship (1) mentioned above, the compressor head (H) is determined using the process values in the process input 31, and the constants calculated at block 22. The head determined at block 23 may further take into account an input 20a indicating surge margin, which is typically a fixed value based on design data. In the present example, the surge margin in the input 20a is a pressure surge margin that is expressed in pressure units. In the computation of the head, the pressure surge margin is added to the compressor discharge pressure. Alternately, the surge margin in the input 20a may be expressed in units of temperature or head. Determination of the head at block 23 is typically based on several fixed and universal constants, which may be further received as inputs 20b. In the illustrated embodiment, the compressor head determined at block 23 is an isentropic head as defined above. In an alternate embodiment, instead of an isentropic head, a polytropic head may be determined as the compressor head at block 23.

Block 24 involves determining the control pressure number ($\psi$) for the given operating point. The control pressure number ($\psi$) is configured for achieving maximum flow at the said operating point. The control pressure number is determined using the input 32 indicating aerodynamic flow sizing at said operating point. In this example, the aerodynamic flow sizing is defined by a variable diffuser position (VD). The variable diffuser position input may be expressed in a scale ranging from 0 (closed) to 10 (100% open). The variable diffuser position (VD) input 32 is a dynamic value, and may be controlled, for example, by the operator. In one embodiment of the present invention, the determination of control pressure number ($\psi$) at block 24 is based on a relationship between pressure number and variable diffuser position defined by a control curve. The control curve may be configured for operating said compressor with a minimum margin to surge at said operating point. The control curve may be obtained as described below.

Figure 3:
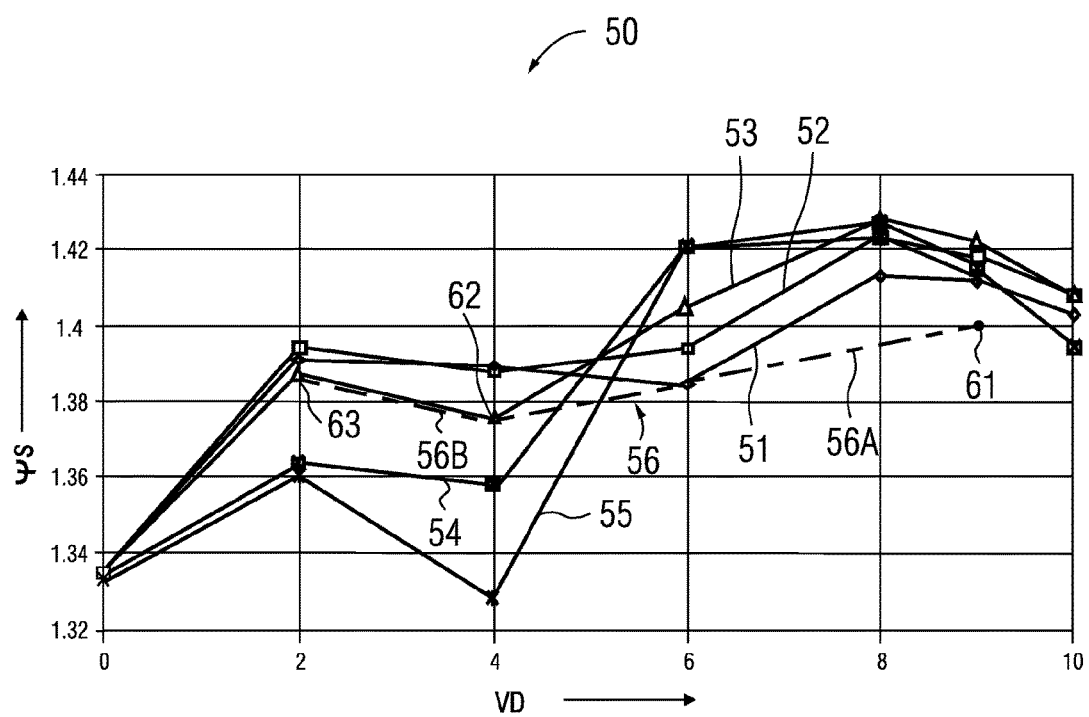
FIG. 3 is an exemplary graph of pressure number at surge versus variable diffuser position, for various compressor speeds, based on compressor test data, the graph also showing the control curve.

To obtain the control curve, a first graph plotting head versus flow for various variable diffuser positions (VD) is obtained from test data of the compressor. The plot should be able to provide pressure number $\psi$ and flow coefficient $\phi$ when a point on a curve is chosen. Based on the graph, the maximum and minimum VD limits (VDmax, VDmin) are determined for which flow is achievable. The VD limits are taken to range from 0.5 to 10 as maximum. While determining the VD limits (VDmax, VDmin), it is verified that the maximum flow can be achieved at each condition. The minimum VD limit (VDmin) is determined by looking at minimum conditions and verifying that the flow can be achieved. Next, based on the compressor test data and PDS, if the speed, head and flow on the PDS match the test data, a maximum pressure number ($\Psi$max) is selected that falls on the maximum VD limit line on the aforementioned graph that will produce flow and head that will satisfy the PDS. Subsequently, the maximum speed (Nmax) based on the selected pressure number value is determined from the PDS. Additionally the minimum speed at minimum operating conditions is determined Further, as shown in FIG. 3, a second graph 50 is obtained from compressor test data, plotting pressure number at surge ($\psi$s) versus variable diffuser position (VD), at various compressor speeds. Herein the curves 51, 52, 53, 54 and 55 are obtained respectively for compressor speeds of 14000 RPM, 16000 RPM, 18000 RPM, 20000 RPM and 21000 RPM. On the graph 50, a first point 61 is plotted. This point is defined by maximum aerodynamic flow sizing limit (VDmax) obtained from the first graph and the maximum pressure number obtained from the PDS. As an example, let it be assumed that the maximum VD limit (VDmax) and the minimum VD limit (VDmin) obtained above are 2 and 9 respectively. Further, let it be assumed that the maximum pressure number (Ψmax) and speed (Nmax) obtained from the PDS are 1.4 and 18000 RPM respectively. Based on these values, the first point 61 would be defined by the maximum VD limit (VDmax=9) and a maximum pressure number (Ψmax=1.4).

Next, a second point 62 is plotted on the graph 50. The second point 62 is defined by the minimum value of pressure number at surge (Ψint) on the curve 53 corresponding to the maximum speed (Nmax=1800 RPM) determined from the PDS and the corresponding intermediate value of VD (VDint). Next, a third point 63 is plotted on the graph 50. The third point 63 is defined by the minimum VD limit (VDmin=2) and the corresponding value of pressure number (Ψmin) on the maximum speed curve 53. Finally, a control curve 56 is obtained using the points 61, 62 and 63. As shown, the control curve 56 includes a first portion 56A defined by the first point 61 and the second point 62, and a second portion 56B defined by the second point 62 and the third point 63.

Based the control curve 56, a mathematical relationship may be established between pressure number and VD that would allow a control pressure number to be developed as a function of variable diffuser position. In the present example, the relationship between pressure number and VD is linear, i.e., defined by straight lines. Accordingly, equations that relate pressure number to VD may be developed wherein the slope and y-intercepts are defined by the coordinates of the points 61, 62 and 63, namely, (VDmax, Ψmax), (VDint, Ψint) and (VDmin, Ψmin)

Referring back to FIG. 2, at block 24, the value of the control pressure number is determined using the values of VDmax, Ψmax, VDint, Ψint, VDmin, and Ψmin as input. These values may be predetermined and fed as a design input 20c to algorithm. Block 24 accordingly includes first calculating the slopes and y intercepts for the equation relating pressure number to VD position based on the input 20c and then using said equation to determine the control pressure number (ψ) as function of the VD value received from the input 32.

Subsequently, at block 25, the operating setpoint the compressor speed (N), is determined using the compressor head (H) determined at block 23, the control pressure number (ψ) determined at block 24, and an input 20d on compressor geometry indicative of the impeller tip diameter (D2), based on relationships (2) and (3) discussed above.

The compressor speed may be controlled based on the speed set point determined at block 25 by providing the speed set point to a variable frequency drive (VFD). Preferably, the speed setpoint obtained at block 25 is first filtered to remove instrumentation and calculation dither from the speed signal. In the illustrated embodiment, at block 26, positive and negative dead band windows are determined around the speed setpoint obtained at block 25. The dead band windows are determined to control the speed value sent to the VFD to let the VFD react to a true change in conditions rather than noise. At block 27, it is determined whether the measured speed feedback obtained from the input 33 lies within or outside the positive and negative dead band windows. Finally, at block 28, the operating speed setpoint is provided to the VFD only if the measured speed feedback lies outside the positive and negative dead band windows.

Aspects of the above-described method may also be embodied in the form of computer program code containing instructions embodied in tangible media, such as floppy diskettes, CD-ROMs, hard drives, DVDs, or any other computer-readable storage medium, wherein, when the computer program code is loaded into and executed by a computer or controller, the aforementioned steps are implemented.

Alternate to the embodiments described above, it may also be possible to control aerodynamic flow sizing at multiple operating points using compressor speed as the basis for controlling aerodynamic flow sizing. Accordingly, the controller of the compressor system may be adapted for determining a head of the compressor based on a measured process value at an operating point and for determining a control pressure number as a function compressor speed at said operating point. The controller may be further adapted for determining a setpoint for aerodynamic sizing of fluid flow through the compressor based on the determined head and control pressure number. The aerodynamic flow sizing, for example, the variable diffuser position, may then be controlled based on the calculated aerodynamic flow sizing setpoint.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the spirit or scope of the present invention as defined by the below-mentioned patent claims.

The invention claimed is:

1. A control method for a compressor, comprising:
providing variable aerodynamic sizing of fluid flow through the compressor at a plurality of operating points of the compressor,
for an operating point of the plurality of operating points, determining a head of the compressor based on a process input at the operating point,
for the operating point of the plurality of operating points, determining a pressure number as a function of aerodynamic flow sizing at the operating point, and
determining, by a control device of the compressor, an operating speed setpoint of the compressor based on the determined head and pressure number, wherein the compressor comprises a rotating impeller having a tip rotating at a tip speed, wherein the pressure number is a function of the head divided by the square of the tip speed,
controlling shaft rotational speed of the compressor using the determined operating speed setpoint, based on a closed loop feedback control mechanism,
wherein the process input includes a measured compressor inlet temperature, and
wherein the process input includes a compressor discharge pressure, further wherein the head is determined based on a pressure surge margin added to the compressor discharge pressure.

2. The method according to claim 1, wherein the aerodynamic flow sizing is defined by a variable diffuser position.

3. The method according to claim 1, wherein the determining of the pressure number is based on a relationship between pressure number and aerodynamic flow sizing, the relationship being defined by a control curve configured for operating the compressor with a minimum margin to surge at the operating point.

4. The method according to claim 3, wherein the control curve is obtained by:
determining maximum and minimum aerodynamic flow sizing limits for which flow is achievable, determining a maximum pressure number that would produce flow for the maximum aerodynamic flow sizing limit, and a maximum speed possible for the maximum pressure number, based on performance data of the compressor, obtaining a test data graph of pressure number at surge versus aerodynamic flow sizing, for various compressor speeds, plotting a first point on the graph defined by the maximum aerodynamic flow sizing limit and the maximum pressure number obtained from the performance data, plotting a second point on the graph defined by a minimum pressure number at surge at the maximum speed and a corresponding aerodynamic flow sizing value, the corresponding aerodynamic flow sizing value being intermediate to the maximum and minimum aerodynamic flow sizing limits, plotting a third point on the graph defined by the minimum aerodynamic flow sizing limit and the corresponding pressure number at surge for the minimum aerodynamic flow sizing limit, at the maximum speed, and obtaining a first line defined by the first point and the second point, and a second line defined the second point and the third point, wherein the control curve is formed by the first line and the second line.

5. The method according to claim 4, further comprising obtaining a test data graph of head versus flow for various aerodynamic flow sizing values, and therefrom determining maximum and minimum aerodynamic flow sizing limits for which flow is achievable.

6. The method according to claim 1, further comprising:
determining a positive and a negative dead band window around the operating speed setpoint,
obtaining a measured speed feedback, and
providing the operating speed setpoint to a variable frequency drive if the measured speed lies outside the positive and negative dead band windows.

7. The method according to claim 1, wherein the control device comprises a non-transitory computer readable media having computer readable program code embodied therein, the program code being executable by the control device, wherein the computer readable media is selected from the group consisting of a programmable logic controller, a microcontroller, a desktop computer and a general purpose microprocessor.

8. A compressor system, comprising:
a rotating impeller comprising a tip rotating at a tip speed,
an arrangement for providing variable aerodynamic sizing of fluid flow through the compressor at multiple operating points of the compressor,
a variable frequency drive for controlling compressor speed based on the operating speed setpoint, and
a control device, comprising:
a head determination module configured to determine a head of the compressor based on a process input at an operating point,
a pressure number determination module configured to determine a control pressure number as a function of aerodynamic flow sizing at the operating point, wherein the control pressure number is determined as a function of the head divided by the square of the tip speed, and
an operating speed setpoint determination module configured to determine an operating speed setpoint of the compressor based on the determined head and control pressure number,
wherein the process input includes a measured compressor inlet temperature, and
wherein the process input includes a compressor discharge pressure, further wherein the head is determined based on a pressure surge margin added to the compressor discharge pressure.

9. The system according to claim 8, wherein the arrangement for providing a variable aerodynamic sizing of fluid flow through the compressor comprises a variable diffuser.

10. The system according to claim 8, wherein the control device includes a programmable logic controller.

11. The system according to claim 8, further comprising a sensor module for measuring the process input, the sensor module including at least a temperature sensor for measuring compressor inlet temperature.

* * * * *